Dec. 28, 1937.    J. L. ANDERSON    2,103,346
TUBE WELDING
Filed April 17, 1936    5 Sheets-Sheet 3

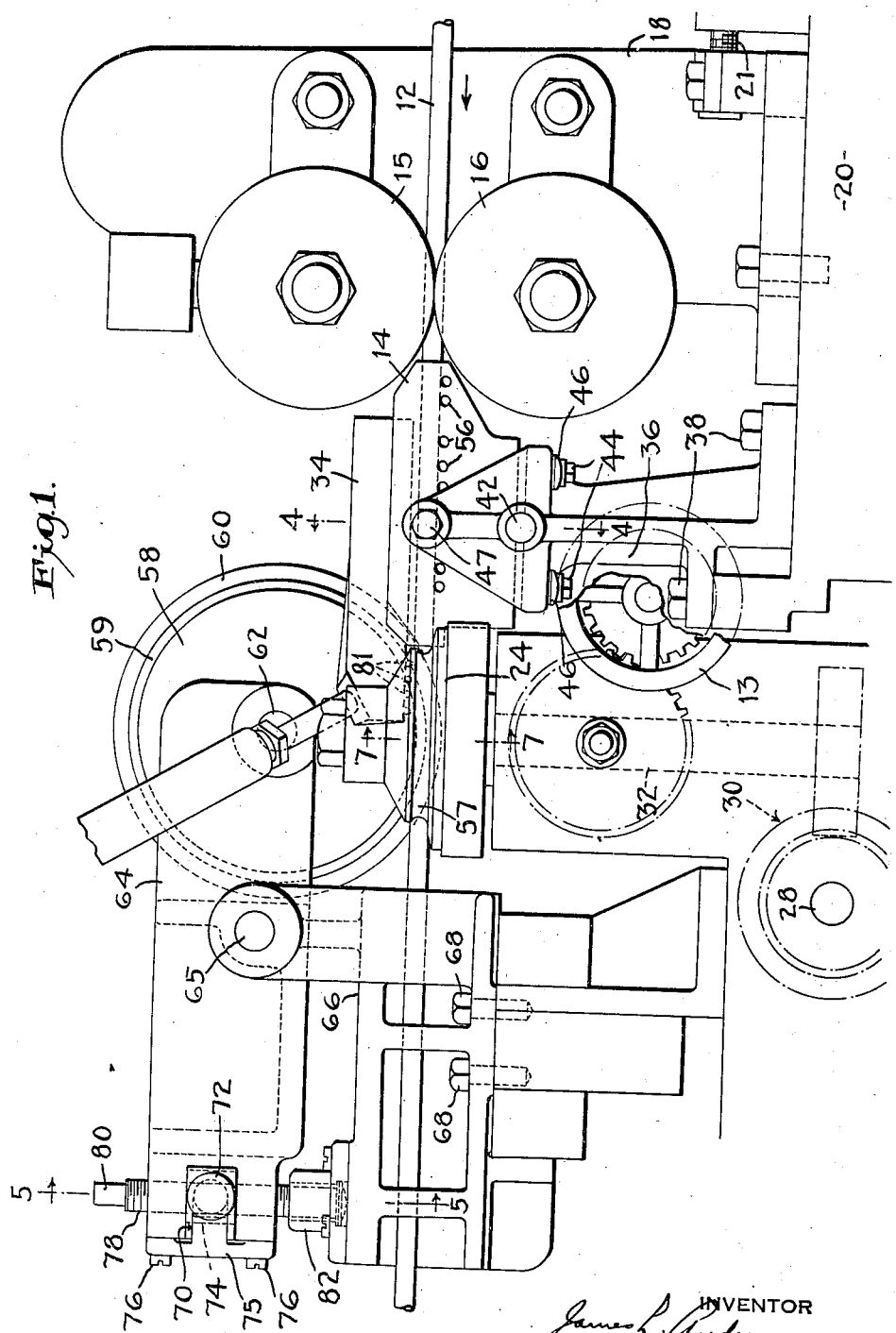

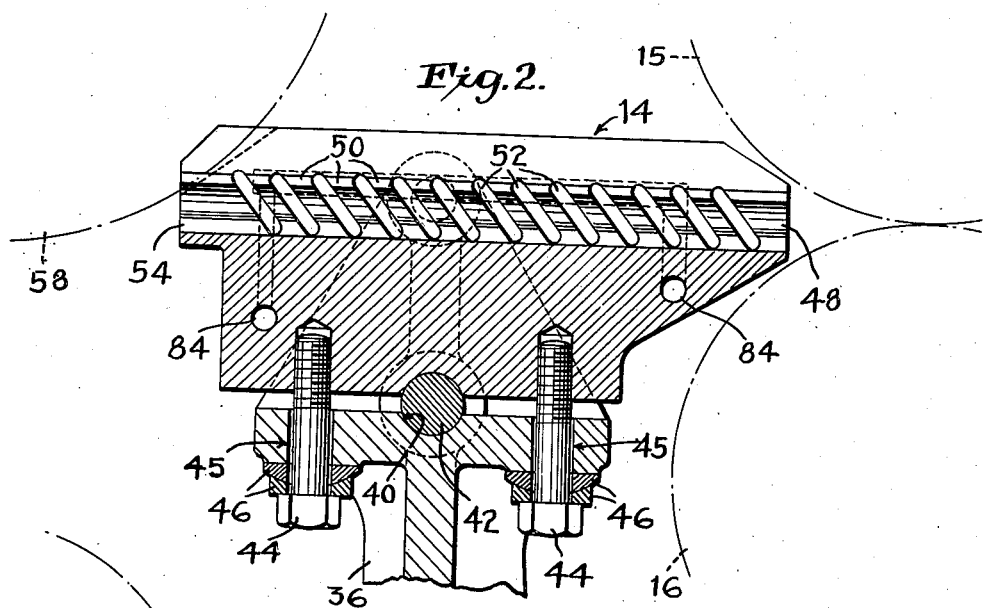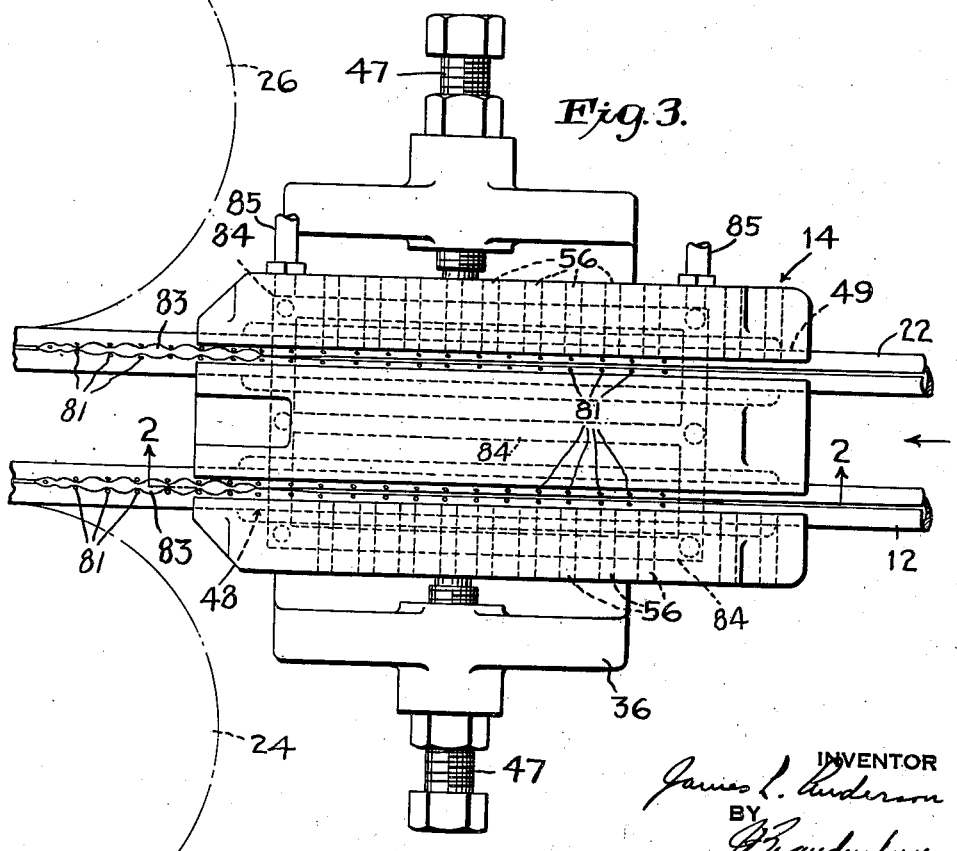

INVENTOR
James L. Anderson
BY
ATTORNEY

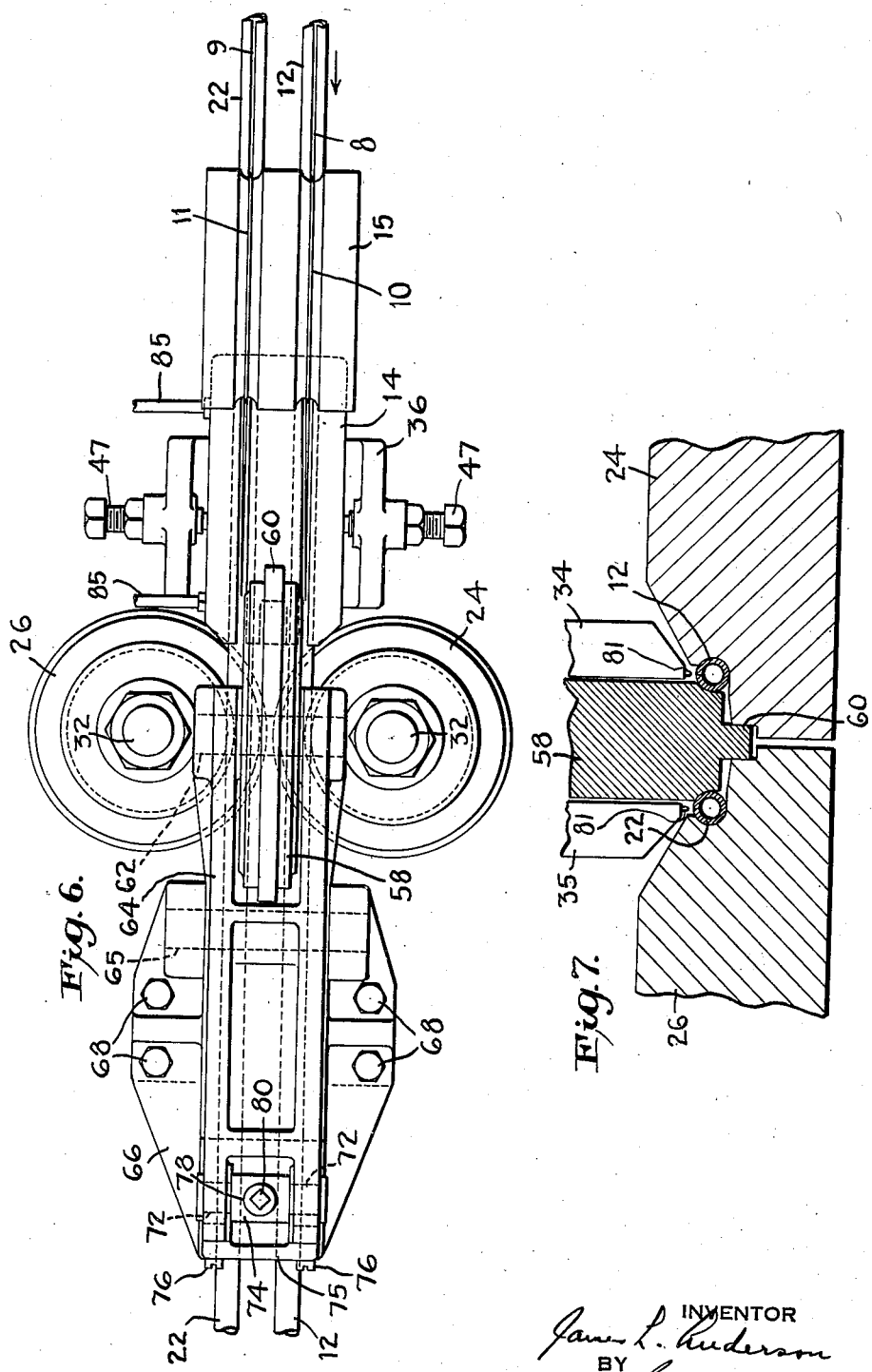

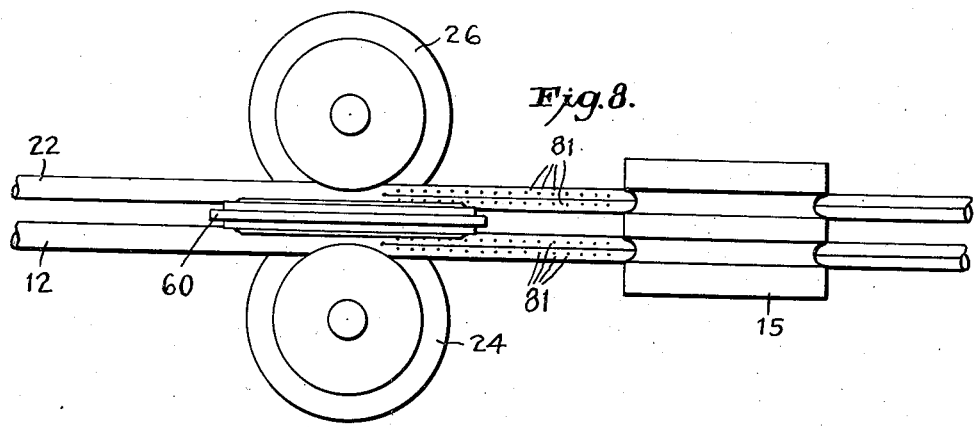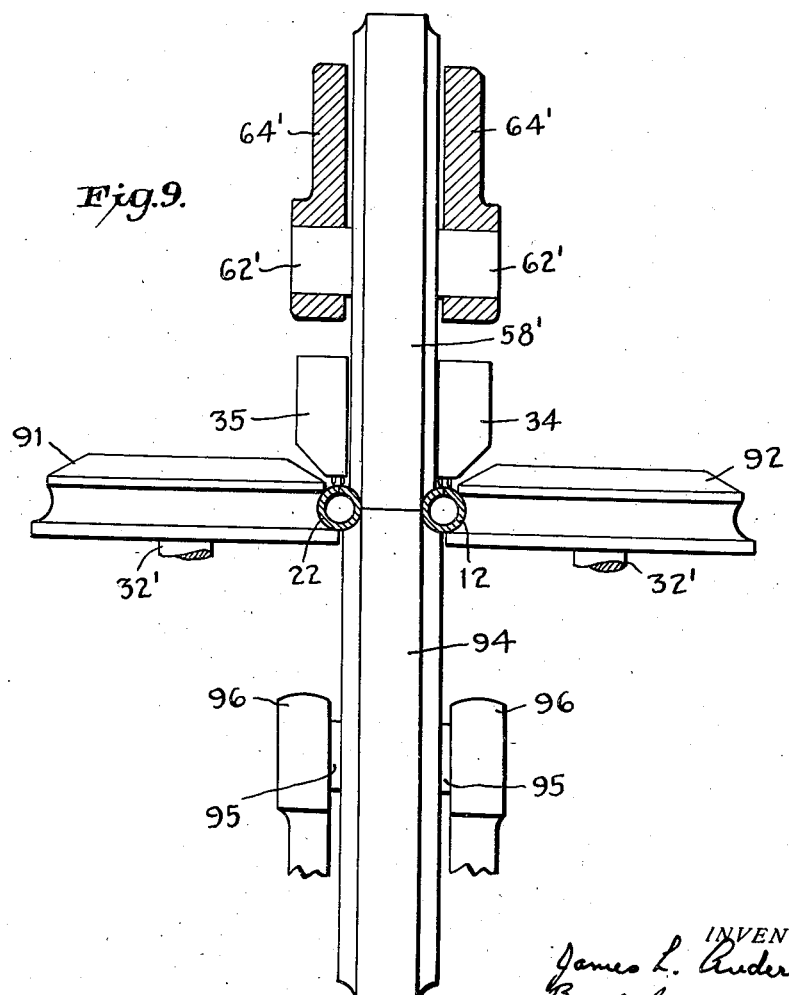

Patented Dec. 28, 1937

2,103,346

UNITED STATES PATENT OFFICE 2,103,346

TUBE WELDING

James L. Anderson, Closter, N. J., assignor to Air Reduction Company, Incorporated, New York, N. Y., a corporation of New York Application April 17, 1936, Serial No. 75,030

13 Claims. (Cl. 78—87)

This invention relates to the manufacture of welded pipe and tubing, and it is an object of the invention to provide apparatus and method with which to obtain larger production of pipe or tubing without proportionate increases in mechanical equipment, fuel, and labor.

The apparatus of the invention comprises a machine having a novel construction which makes it capable of welding a plurality of tubes simultaneously although the machine is little larger than a single tube welding machine and contains few additional parts.

In accordance with the method of this invention, the tubes are heated simultaneously and so close together that the heating agency applied to each tube assists in the heating of one or more other tubes at the same time. The surfaces of the tubes are preferably enveloped in hot reducing gases while being heated, and the seam edges are caused to come together progressively to make a weld immediately after the completion of the heating step.

It has been proposed to weld two tubes simultaneously in a double machine, but as far as I am aware such plans required in reality the elements of two complete tube welding machines disposed side by side on a common support, and the amount of gas required to heat each tube was as great as if the tubes were welded on separate single tube welding machines.

With this invention the tubes are located so close together that a single operator can easily attend the welding of two tubes, or even more, and the method of heating the tubes effects an important saving in the amount of heat required. Further economy of gases is obtained by confining the hot envelope gases liberated from high temperature jets, and causing them to burn, close around the tubes over considerable portions of their length in advance of the welding regions, so that the bodies of the tubes are preheated in an effective manner. This is preferably accomplished by providing a heater extending between the seam guides and the welding or holding rolls, this heater having longitudinal passages, one for each tube, and also affording passage for the gases and entrained air about the tubes. In most instances the heater constitutes a guide for the formed tubes, to keep them running true, to prevent them from opening up, and to maintain the edges of the seam at the desired narrow spacing or degree of proximity as they pass beneath the flames.

One feature of the invention relates to a novel combination of rolls for holding the tubes in the region of the weld. This novel construction permits the tubes to be close together, and holds the tubes to shape during the welding operation. These rolls may be termed holding, welding, or compression rolls, their functions being susceptible of some variation. In the preferred embodiment of the invention these rolls are adjacent, the distance between their faces which contact with the tubes being less than the diameter of either roll.

This application is a continuation in part of my application Serial No. 617,130, filed June 14, 1932.

Other objects, features and advantages of the invention will appear or be pointed out as the specification proceeds.

In the accompanying drawings, forming part hereof:

Fig. 1 is a side elevation of enough of a tube-welding machine to illustrate the invention, tubing being shown passing through the machine and being welded;

Fig. 2 is an enlarged vertical section taken on the line 2—2 of Fig. 3, certain rolls being indicated by broken line arcs;

Fig. 3 is an enlarged plan view of the duplex heater and tube guide, showing both tubes passing and being integrally welded by a long puddle process;

Fig. 6 is a plan view of the part of the machine shown in Fig. 1, together with two tubes, omitting the torches and the framework of the machine;

Fig. 7 is an enlarged fragmentary vertical transverse section taken on the line 7—7 of Fig. 1;

Fig. 8 is a diagrammatic top plan view with the torches omitted but the flames indicated to show their proximity in a common heat zone; and Fig. 9 is a detail view showing a modified welding roll construction for machines welding light-wall tubing.

Figure 4:
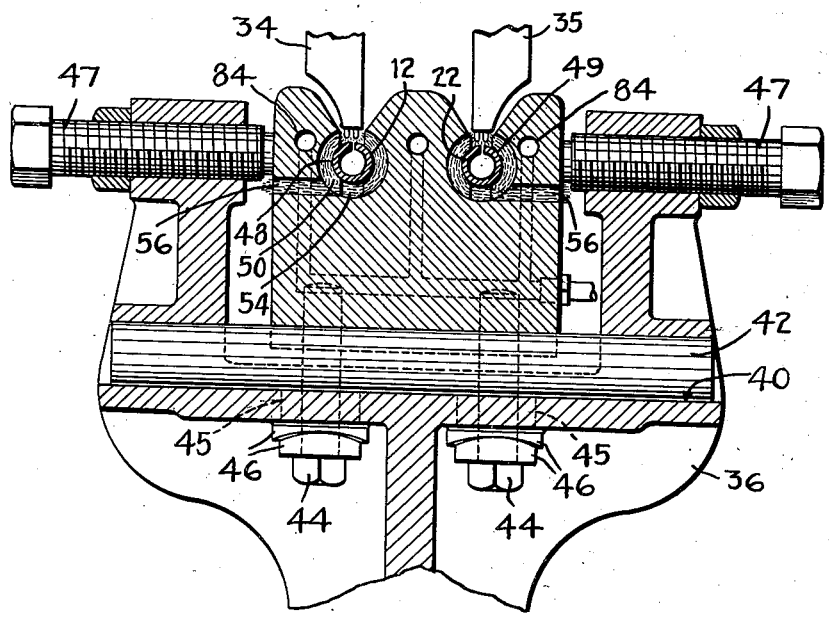
Fig. 4 is an enlarged vertical transverse section taken on the line 4—4 of Fig. 1.

The pre-formed, open-seam or unwelded tubes 12 and 22 are introduced to the machine at the right-hand end in Figs. 1 and 6. Their unwelded seams 8 and 9 are guided by seam guides 10 and 11 (Fig. 6) which extend between the edges of the clefts and separate them at a narrow spacing should the edges be too close together. These guides are preferably circular fin blades held between the sections of the upper one of a pair of feed or guide rolls 15 and 16, each of these rolls having a plurality of grooves for the tubes.

These rolls are preferably driven by the power mechanism of the machine, in a manner which is familiar in tube welding machines, and are supported on a stand 18, which is shiftable fore and aft on the main frame 20 by a screw adjustment 21.

From the seam guides, the tubes pass through a heater and guide 14 and beneath a pair of oxyacetylene torches 34 and 35, which will be understood as being supported adjustably by torch brackets of a conventional type, not necessary to illustrate.

Immediately beyond the guide 14, the tubes pass through a holding roll assembly, which comprises a pair of adjacent grooved rolls 24 and 26 on substantially vertical shafts 32, together with an intervening element which preferably consists of a vertical roll 58 turning on a substantially horizontal axle 62 above the horizontal rolls 24 and 26. Following ordinary terminology, the rolls 24 and 26, which are adjacent the welding region, may be termed welding rolls, though in a true autogenous welding operation they do not make the weld. As is customary in single tube welding machines, provision is made for adjusting these rolls toward each other, to confine the freshly welded tubing, or to apply compression to the welds while they are still plastic or semi-solid, or in some cases to force the fused edges together and thus play a more active part in making the weld. Rolls of similar location in ordinary tube welding machines are often referred to as compression rolls. In making autogenously welded pipe and tubing it is sometimes desired that substantially no compression be applied to the welded seams, but in most instances it is of advantage to work the welds more or less, either to bring them up to the round of the pipe or to improve the grain structure.

A means for adjusting the degree of proximity of the rolls 24 and 26 is represented by the hand wheel 13. These rolls are driven from a power shaft 28, which transmits power through gearing 30 to both shafts 32. For further illustration of details applicable to the mounting, driving and adjustment of such rolls, reference may be had to my Patent No. 1,520,271, dated December 23, 1924.

The torches 34 and 35 have long tip blocks which extend lengthwise over the paths of the tubes, between the seam guides 10, 11 and the holding or welding roll assembly 24, 26, 58. The forward ends of the blocks are comparatively near the seam guides, and their rear portions extend to regions near the transverse center line of the rolls 24 and 26. These torches deliver seamwise-extending flames or series of flames which are directed at the seam portions of the tubes over distances of several inches to a foot or more.

Each torch may be drilled to deliver either a single line of jets or a plurality of rows of jets, or combinations of laterally spaced jets and jets acting in the center line may be employed. Some of the rear cones 81 of the jets of the torch 34 are seen in Fig. 1, no attempt being made, however, to represent the envelope flame. The positions of the cones of double-row arrangements of jets are indicated by the circles 81 in Fig. 3. These high-temperature jets put successive increments of heat into the seam portions of the tube until the metal of the edges is brought to fusion as they come closer together under the influence of the rolls 24 and 26. The narrow but open clefts which are insured by the seam guides 10 and 11 enable the intense heat to have effect on the full depth of the edge faces, so that welds of thorough penetration are obtained. The edges commence to melt throughout the depth, the melting progresses and involves more metal until elongated puddles 83 are formed, the metal of these puddles solidifying behind the torches to form integral and substantially homogeneous portions of the pipe walls.

This manner of welding the tubes is especially advantageous. However, if the tubes are driven very fast, or if less heat is used, the state of fusion may be confined to the seam edge faces only, in which event the faces may be forced to unite in more or less of a pressure weld by compression exerted through the rolls 24, 26.

The heater guide 14 also extends lengthwise in the space between the seam guides 11 and the welding roll assembly 24, 26, 58. At the front (that is to say its end toward the feed-in end of the machine), it projects beyond the torches and their flames. In the other direction, the rear portions of the torches and their welding flames extend beyond the heater guide, as seen in Fig. 1. The part 14 has one or both of two functions. One of these functions is to receive and utilize the envelope gases, which in the case of oxyacetylene flames are not only hot from the primary combustion reaction between the oxygen of the mixture and the carbon of the acetylene, but are themselves, being composed of carbon monoxide and hydrogen, capable of generating heat by secondary combustion with the oxygen of the air. This secondary combustion must take place if the flames are to remain alight at all. By entrapping the copious supply of these gases, at the same time drawing or forcing in air, and causing them to circulate and burn close around the tubes within the confinement of the heater, the bodies of the tubes are preheated to a high temperature, and thereby the consumption of oxygen and acetylene, or other fuel gas, is reduced, or the linear speed of welding is increased, materially, in addition to which better welds can be made. The other function of the part 14, utilization of which may not always be required, is to guide the tubes in accurate relation to the torches, and especially to keep the tubes from opening up, with consequent wide spreading apart of the seam edges, as the result of the heat releasing internal strains in the metal.

The heater guide 14 is carried by a guide support 36, which is detachably secured to the main frame by screws 38. As shown in Fig. 2, the guide support has a transverse arcuate groove 40 extending across its top, and a shaft 42 fits in this groove. The bottom face of the guide member 14 has a transverse arcuate groove, similar to the groove 50 and fitting over the shaft 42. Thus, the guide member 14 can be rocked on the shaft 42, but is ordinarily held against rocking movement by screws 44.

The screws 44 fit loosely through holes 45 in the guide support 36, and thread into the guide member 14. A pair of special washers 46, having complementary aces of ball and socket form, are located between the head of each screw 44 and the surface of the guide support, so that the screws 44 will have a firm clamping action on the guide support when the axes of the screws are not at right angles to the surface of the guide support. When the operation of the welding machine is first started, the screws 44 are backed off, so that the guide member is free to aline itself with the tubes as they pass from the tube rolls to the welding rolls, after which the adjustment is set.

The holes 45 in the guide support 36 (Fig. 4) are elongated in the transverse direction, so that the guide member can be shifted longitudinally on the shaft 42 for proper alinement in that direction. The guide member 14 is held against free shifting movement along the shaft 42 by clamping screws 47, which thread through the sides of the guide support 36 and are locked at the proper adjustment by lock nuts.

The guide member 14 is preferably a metal block of considerable mass. It has a pair of parallel tube passages 48 and 49 of substantially circular cross-section, through which the tubes pass. There is a slot opening through the top wall of each of the tube passages 48 and 49. These slots extend along the seam portions of the tubes, so that the flames of the torches can operate on the seams to weld the tubes. The material of the guide extends above the slotted openings and is shaped so that the side walls of the slots flare upwardly at opposite sides of the torch tips, forming converging entrances within which the torch blocks are partly received. The burning gases entrain air through these entrances and the mixture of envelope gases and air is guided about the tubes in the manner about to be described.

The wall of the passage 48 has numerous parallel ribs 50. The faces of these ribs are the bearing surfaces for the tube 12 when passing through the guide member, and the grooves 52 between the ribs provide passages for guiding the flow of hot gases around the tube. The grooves preferably slope downwardly in a direction opposite to that in which the tube is moved. Thus, in Fig. 2, the ribs and grooves slope downwardly toward the right, and a tube passing through the guide member is moved toward the left. The inclination of the ribs obviates any difficulty of the tube catching on the ribs, and the inclination of the grooves promotes the preheating effect by directing the gases forwardly toward the point from which the tube is coming. The tube passage 49 is formed with similar ribs and grooves. For convenience of illustration, the tube and gas passages are shown in Fig. 4 as they would appear if this portion of the plane of section were parallel to the inclination of the ribs and grooves.

The ribs 50 terminate at their lowest ends at longitudinal grooves 54 (Fig. 4), which extend along beneath the tubes. The guide block has two sets of exhaust openings 56 opening from the longitudinal grooves 54 through the sides of the block. Fig. 4 illustrates the flow of hot envelope gases from the welding flame in the top slots, around the tubes, and out through the exhaust openings. This part of the invention is particularly designed for use with flame welding, but it may also be adapted for use in electric arc welding, in which hot gases are generated around the arc.

The ribs of the passages 48 and 49 are shown bearing against the tubes 12 and 22, and while the guide member is generally used in this manner, it may also be used as a heater only without actually guiding the tubes. In that event, the passages would be larger than the tubes and the ribs and grooves might be omitted, though these provisions are of advantage in any event for guiding the hot gases along and around the surfaces of the tubes.

After passing through the guide member 14, the tubes pass between the welding rolls 24 and 26. The tube 12 contacts with the welding roll 24, and the tube 22 contacts with the welding roll 26, as shown in Fig. 7. The third welding roll 58 extends between the tubes 12 and 22, and holds them in contact with the welding rolls 24 and 26. In Fig. 7, the tube 12 is shown in contact with a peripheral groove of the welding roll 24, which is curved to fit the tube. The tube 22 is shown in contact with a similar peripheral groove on the welding roll 24. The third roll 58 has lateral peripheral grooves for contact with the respective tubes, as shown in Fig. 7. The groove of the roll 26 is marked 57 in Fig. 1 and one of the grooves of the roll 56 is marked 59 in the same view.

The grooves of the horizontal rolls 24 and 26 bear against the outer or more remote sides of the tubes, and the grooves of the central or vertical, roll 58 contact with the inner or more proximate sides of the tubes. In addition, the surfaces of the rolls 24 and 26 extend beneath the tubes, and the grooves of the rolls extend sufficiently over the tubes, so that the tubes are held against any vertical as well as against any lateral displacement. When the rolls 24 and 26 are adjusted toward each other and toward the roll 58 sufficiently to produce more or less transverse compression on the welds, tube 12 is gripped between the roll 24 and the roll 58 and the tube 22 is gripped between the roll 26 and the roll 58. While the roll 58 is preferably a single member, it is obvious that it might be divided.

The rolls 24 and 26 have upper portions of relatively smaller diameter and lower portions of relatively larger diameter, their tube grooves being formed at the junction of these parts.

A tongue 60 extends around the periphery of the third roll 58, and enters between peripheral surfaces of the lower, larger diameter portions of the welding rolls 24 and 26. In Fig. 7, the sides of the tongue 60 are shown in contact with the surfaces of the rolls 24 and 26, and it is evident that the tongue limits the minimum spacing between the welding rolls 24 and 26, and between the tube grooves of these rolls and the tube grooves of the roll 58. If the rolls 24 and 26 are moved further apart than shown in Fig. 7, the tongue 60 will not contact with them.

Figure 5:
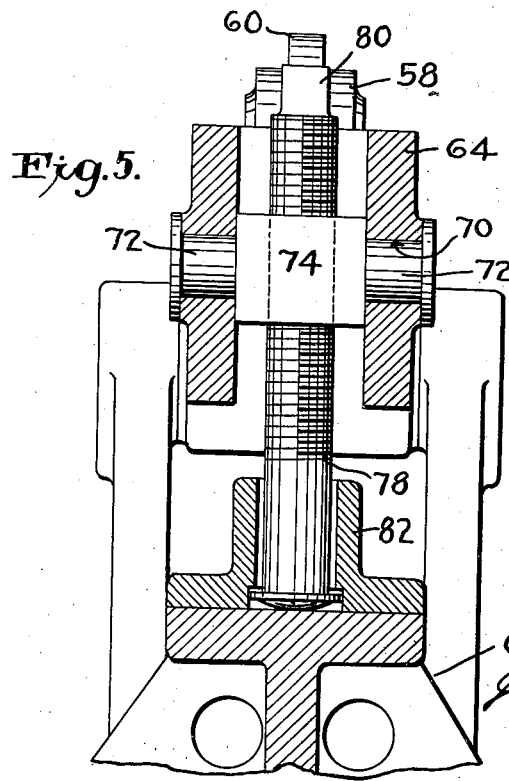
Fig. 5 is an enlarged vertical transverse section taken on the line 5—5 of Fig. 1.

The roll 58 is adjustable vertically to change the pressure which this third roll exerts against the tubes or the confinement which it produces. The adjustable support for the third roll 58 is shown in Figs. 1 and 5.

The roll 58 has an axle 62, which is held in a bifurcated end of a lever 64. This lever 64 is pivotally supported at 65 by a bracket 66, which is secured to the frame of the machine by screws 68.

The end of the lever 64 remote from the roll 58 is bifurcated and has a slot 70, which provides a bearing for trunnions 72, which are secured to a nut 74. A bearing cap 75 is attached to the end of the lever 64 by screws 76, and this bearing cap holds the trunnions 72 in the slot 70.

An adjusting screw 78 is threaded into the nut 74, and the upper end of the adjusting screw has a square end 80 for receiving a wrench. The lower end of the adjusting screw 78 has a rounded head, which contacts with a bearing surface on the bracket 66. A retaining socket 82 holds the adjusting screw 78 against displacement on the bracket 66, but the adjusting screw fits loosely in the retaining socket and has a limited angular movement.

The third roll 58 is adjusted with respect to the welding rolls 24 and 26 by turning the adjusting screw 78. If the roll 58 is to be moved downwardly closer to the welding rolls 24 and 26, to increase the pressure on the tubes, the adjusting screw 78 is turned to the right, which causes the nut 74 to move upwardly and raise the slotted end of the lever 64.

Fig. 8 is a diagrammatic plan view with the torches removed to expose the heated regions of the tubes. The positions of the flame jets are indicated by the circles 81. This view shows clearly the close proximity of the regions in which both tubes are heated simultaneously. The tubes are so close together that the heating means applied to the tubes create a heating zone common to both tubes. This method of heating makes possible a very important saving in gases or increase in speed of welding or both. Each torch not only heats the tube toward which its flame jets are directed, but supplies a substantial quantity of heat to assist in the heating of the other tube. The guide 14 is not shown in Fig. 8 since that part may be omitted.

To prevent local overheating of the heater guide 14, conduits 84 are provided in it, and a cooling medium, such as water, is circulated through the conduits. The cooling medium is supplied from an external source and conducted away through connecting conduits 85.

Fig. 9 shows a modified welding roll construction for welding thin-wall tubing. This modified construction embraces almost the entire periphery of the tubes below the seam edge portions, and the shape of the tubes is maintained during the welding operation even though the tubes are of thin-wall stock.

Welding rolls 91 and 92 turning on substantially vertical shafts 32' contact with the tubes along arcs similar to the arcs of contact of the rolls 24 and 26 in Fig. 7, but the welding rolls 91 and 92 do not extend under the full width of the tubes as do the rolls 24 and 26. The shafts 32' can be adjusted in the same manner as the shafts 32. A lower roll 94, which turns on a horizontal axle 95, contacts with the confronting lower quadrants of the tubes, a portion of the periphery which the rolls of Fig. 7 do not touch. The axle 95 is supported in pedestal bearings 96 connected with the frame of the machine.

An upper roll 58' confines the tubes 12, 22 along the same arcs of contact as the roll 58 of Fig. 7. The roll 58' has an axle 62' held in the bifurcated end of a lever 64', which is in all respects similar to the lever 64 and provided with the same adjusting means.

The invention has been illustrated in connection with a flame welding machine, and relates more particularly to that class of welding, but for certain purposes of this invention an electric arc or other source of welding heat may be considered a mechanical equivalent. The heater guide member may be made of several parts connected together, somewhat as in the single heater guide of my Patent No. 1,960,524, dated May 29, 1934, a double torch might be used instead of a pair of torches, and various other changes and modifications may be made without departing from the invention set forth in the appended claims.

I claim:

1. In a machine for welding the longitudinal seams of two tubes traveling in adjacent and generally parallel courses, the combination of torches disposed to apply high-temperature flames to the seam regions at juxtaposed portions of the courses, and a set of rolls laterally holding both tubes adjacent the welding regions, said set of rolls comprising two adjacent rolls constructed and arranged to contact with the outer sides of the respective tubes, and roll means in axially angular relation to said two rolls and extending into the narrow spacing between the tubes and into contact with the inner sides of the tubes adjacent the welding regions to hold the tubes against said adjacent rolls.

2. A machine for welding two tubes simultaneously having means for holding both tubes adjacent the welding regions, said means comprising a pair of adjacent rolls turning on substantially vertical axes to bear against the outer sides of the two tubes, and an intervening roll turning on a substantially horizontal axis and shaped and located so as to enter into contact with the inner sides of the tubes adjacent their regions of contact with said pair of rolls.

3. A machine for welding two tubes simultaneously having means for holding both tubes adjacent the welding regions, said means comprising a pair of adjacent rolls turning on substantially vertical axes and so constructed and arranged as to bear against the outer sides of the two tubes, and an intervening roll turning on a substantially horizontal axis and shaped and located so as to enter into contact with the inner sides of the tubes in the region of contact of the tubes with the pair of rolls, the axis of said intervening roll being above the pair of rolls.

4. A machine as characterized in claim 2, further characterized in that means are provided for driving the pair of rolls whereas the intervening roll is undriven except by the tubes.

5. In a machine for welding two tubes simultaneously, a tube pass comprising a pair of adjacent welding rolls turning on substantially vertical axes, said rolls having peripheral grooves formed to contact with the outer sides and under portions of the adjacent, parallel tubes in the region of the welds, and an intervening roll turning on a substantially horizontal axis above said pair of rolls, said intervening roll having peripheral grooves to contact with the inner sides of the tubes in the region of the welds to hold each tube in contact with its respective roll of said pair.

6. In a machine for welding two tubes simultaneously, a tube pass comprising a pair of rolls turning on substantially vertical axes and formed to engage the outer sides of a pair of tubes, and an adjacent intervening roll turning on a substantially horizontal axis and formed to engage the inner sides of the tubes adjacent their regions of contact with said pair of rolls, the construction being such that the tubes are held by the pair of rolls in cooperation with the intervening roll.

7. In a machine for welding two tubes simultaneously, the combination of a pair of adjustable rolls turning on substantially vertical axes and formed to engage the outer sides of a pair of tubes, and an intervening roll turning on a substantially horizontal axis and formed to engage the inner sides of the tubes, said intervening roll having a portion entering between the proximate portions of the pair of rolls and adapted to coact directly therewith to limit the inward adjustment of the rolls of said pair.

8. In a machine for welding two tubes simultaneously, the combination of a pair of multiple jet welding torches extending abreast of each other lengthwise of the seam paths, means for guiding two tubes and their seams to said torches, a pair of welding rolls turning on substantially vertical axes close beyond said torches, said rolls being so constructed and arranged as to bear against the outer sides of the tubes, and an intervening roll turning on a substantially horizontal axis and so constructed and arranged as to contact with the inner sides of the tubes, these three rolls adapted to hold and press the tubes as they pass from the torches.

9. In a machine for welding two tubes simultaneously, the combination of a pair of multiple jet welding torches extending abreast of each other lengthwise of the seam paths, a pair of seam guides in front of said torches, a pair of rolls turning on substantially vertical axes close beyond said torches and so constructed and arranged as to bear against the outer sides of the tubes, an intervening roll turning on a substantially horizontal axis and so constructed and arranged as to contact with the inner sides of the tubes, these three rolls adapted to hold and press the tubes as they pass from the torches, and a heating enclosure through which the tubes pass between said seam guides and said rolls and beneath the torches, said enclosure having slotted openings at the top for the torch flames and receiving the hot combustible torch envelope gases and entrained air to heat the bodies of the tubes therewith.

10. In a machine for welding two tubes simultaneously, the combination of a pair of multiple jet welding torches extending abreast of each other lengthwise of the seam paths, a pair of seam guides in front of said torches, a pair of rolls turning on substantially vertical axes close beyond said torches and so constructed and arranged as to bear against the outer sides of the tubes, an intervening roll turning on a substantially horizontal axis and so constructed and arranged as to contact with the inner sides of the tubes, these three rolls adapted to hold and press the tubes as they pass from the torches, and a heating enclosure through which the tubes pass between said seam guides and said rolls and beneath the torches, said enclosure containing a pair of longitudinal tube passageways having slotted openings at the top for the torch flames, said enclosure likewise providing for passage of the hot torch gases about the tubes.

11. In a machine for welding two tubes simultaneously, the combination of a pair of multiple jet welding torches extending abreast of each other lengthwise of the seam paths, a pair of seam guides in front of said torches, a pair of rolls turning on substantially vertical axes close beyond said torches and so constructed and arranged as to bear against the outer sides of the tubes, an intervening roll turning on a substantially horizontal axis and so constructed and arranged as to contact with the inner sides of the tubes, these three rolls adapted to hold and press the tubes as they pass from the torches, and a duplex tube guide extending between said seam guides and said rolls, said tube guide having longitudinal tube passageways slotted at the top for the torch flames, and being further provided with numerous channels for conducting the hot torch envelope gases and entrained air about the tubes.

12. A tube welding machine including a pair of rolls for moving two parallel tubes through the machine simultaneously and so constructed and arranged that one of the tubes contacts with one of the rolls and the other tube with the other roll; a third roll with its axis at an angle to the axes of the other rolls, the periphery of the third roll extending between the pair of rolls and holding both of the tubes against the respective rolls with which each tube contacts; and means for adjusting the third roll to change the pressure which the third roll exerts against the tubes.

13. In a tube welding machine, mechanism for passing a pair of parallel tubes through the machine; means for welding the tubes; a pair of welding rolls through which the tubes pass after welding, the welding rolls having substantially parallel axes, and each of said welding rolls having a peripheral face curved to receive one of the tubes; a third roll with an axis substantially at right angles to the axes of the welding rolls, the periphery of said third roll extending between the welding rolls and having faces curved to fit the tubes for holding each of the tubes against the respective welding roll with which it is in contact; a support for the third roll; and means for adjusting the support to change the position of the third roll with respect to the welding rolls, and thus regulate the pressure which said third roll exerts against the tubes.

JAMES L. ANDERSON.